United States Patent [19]
Holcomb

[11] Patent Number: 6,034,504
[45] Date of Patent: Mar. 7, 2000

[54] TWO-WIRE MULTI-RATE BATTERY CHARGER

[75] Inventor: Henry Holcomb, Raleigh, N.C.

[73] Assignee: Ericsson Inc., Research Triangle Park, N.C.

[21] Appl. No.: 09/095,190

[22] Filed: Jun. 10, 1998

[51] Int. Cl.⁷ .......................... H01M 10/44; H01M 10/46
[52] U.S. Cl. ............................. 320/110; 320/123
[58] Field of Search ..................... 320/106, 110, 320/125, 128, 132, 134, 136, 160

[56] References Cited

U.S. PATENT DOCUMENTS

| | | | |
|---|---|---|---|
| 3,775,659 | 11/1973 | Carlsen, II | 320/21 |
| 3,969,673 | 7/1976 | Nordlöf | 325/16 |
| 4,006,396 | 2/1977 | Bogut | 320/2 |
| 4,091,318 | 5/1978 | Eichler et al. | 320/2 |
| 4,472,672 | 9/1984 | Pacholok | 320/21 |
| 4,673,861 | 6/1987 | Dubovsky et al. | 320/2 |
| 4,709,202 | 11/1987 | Koenck et al. | 320/43 |
| 4,737,702 | 4/1988 | Koenck | 320/40 |
| 4,843,299 | 6/1989 | Hutchings | 320/31 |
| 4,965,738 | 10/1990 | Bauer et al. | 364/483 |
| 5,115,182 | 5/1992 | Ehmke et al. | 320/14 |
| 5,122,544 | 6/1992 | Terry et al. | . |
| 5,122,722 | 6/1992 | Goedken et al. | 320/22 |
| 5,130,634 | 7/1992 | Kasai | 320/22 |
| 5,150,031 | 9/1992 | James et al. | 320/2 |
| 5,164,652 | 11/1992 | Johnson et al. | 320/2 |
| 5,177,426 | 1/1993 | Nakanishi et al. | 320/13 |
| 5,184,059 | 2/1993 | Patino et al. | 320/15 |
| 5,191,277 | 3/1993 | Ishikura et al. | 320/22 |
| 5,237,257 | 8/1993 | Johnson et al. | 320/2 |
| 5,254,931 | 10/1993 | Martensson | 320/22 |
| 5,325,040 | 6/1994 | Bogut et al. | 320/22 |
| 5,349,282 | 9/1994 | McClure | 320/32 |
| 5,367,242 | 11/1994 | Hulman | 320/2 |
| 5,438,252 | 8/1995 | Perelle | 320/44 |
| 5,668,462 | 9/1997 | Hansson et al. | 320/12 |

Primary Examiner—Edward H. Tso
Attorney, Agent, or Firm—Wood, Phillips, VanSanten, Clark & Mortimer

[57] ABSTRACT

A battery charger includes a first portion of a charging circuit with first and second terminals, a detector for detecting a selected signal sequence in the charging circuit, and a regulator for switching from a first output level to a second output level in the charging circuit in response to the detector detecting the selected signal sequence. A communication unit has a port for a rechargeable battery and includes a second portion of the charging circuit through the battery port with third and fourth terminals connectable with the first and second terminals and fifth and sixth terminals connectable to terminals of a rechargeable battery when in the port. The communication unit also has a switch in the second portion of the charging circuit controlled by a processor, with the processor adapted to control the switch according to the selected signal sequence when a battery is in the port which requires the second output level. The regulator may also open the circuit first portion responsive to a selected condition such as excess current or a fault in the charging circuit. This uses a method of charging a mobile communication unit battery by connecting the terminals to close the charging circuit with a battery therein, detecting the presence of a selected condition (the presence of such condition causing a switch in the circuit second portion to be automatically thrown according to a selected sequence), and selecting a second output level for the external current source in response to the switch being thrown according to the selected sequence.

17 Claims, 1 Drawing Sheet

TWO-WIRE MULTI-RATE BATTERY CHARGER

BACKGROUND OF THE INVENTION

1. Technical Field

The present invention is directed toward battery chargers, and more particularly toward chargers usable with different batteries for mobile communication units which may be charged with different currents.

2. Background Art

Mobile communication units such as cellular telephones for the most part are powered by portable batteries which are connected to the units and which must be periodically recharged.

In many cases, battery chargers are provided in which the battery may be taken from the phone and charged. In such cases, however, the phone is then either taken out of service during charging or a second battery must be available to use while the first is being charged.

Alternately, some battery chargers are adapted to charge the battery while it is in the phone. Such chargers allow the phone to be available for use while its battery is charging. Typically, the charging may be accomplished by connecting a two-wire charger output to a two-wire charging input on the phone.

However, as a current example, 3 V platform phones now in the market may be used with different batteries which may be charged at different rates. Small batteries (e.g., 450 mAh batteries) usable with such phones can be safely charged by approximately 700 mAh output from the charger. Larger batteries may be safely charged using greater output (e.g., 900 mAh) but using such a greater output to charge the small batteries can damage the small batteries. As a result, to safely charge batteries in such phones, it is necessary to charge at only 700 mAh output maximum (to ensure that a small battery not be damaged if that is what is in the phone), which unfortunately means that the larger batteries are not charged as quickly as they could be. That is, while the larger batteries could be most quickly charged by use of chargers having a greater output such as 900 mAh (whether such output is all that is provided by the charger or one of several which may be manually selected), if the phone is inadvertently or unknowingly placed in a charger with such a greater output while the phone has a smaller battery, the battery would be damaged or destroyed. Further, while an extra lead (e.g., third-wire communication circuit) could be provided to signal from the phone to the charger what type of battery is being charged for automatic selection of the appropriate output, such an extra circuit would be incompatible with most other accessory system connectors which only allow for a two-wire interface at the charger interface connector.

Further, in many cases when the phone is in use while in a charger, as is common when used in a vehicle charger, the phone draws more current when transmitting than the typical charger puts out. In case the phone is put in such a charger when its battery is almost discharged and then begun to be used, the continued gradual draining of the battery during subsequent transmitting (when current from the charger must be supplemented by current from the battery) could result in a call being dropped, with the battery then so discharged that it will take some time for sufficient power to be restored to the battery to enable the user to reconnect the dropped call.

The present invention is directed toward overcoming one or more of the problems set forth above.

SUMMARY OF THE INVENTION

In one aspect of the present invention, a communication unit and external power source are provided. The external power source includes a first portion of a power circuit with first and second terminals, a first detector for detecting a selected signal sequence in the power circuit, and a regulator for switching from a first output level to a second output level in the power circuit in response to the first detector detecting the selected signal sequence. The communication unit includes a second portion of the power circuit having third and fourth terminals connectable with the first and second terminals, a second detector for detecting a selected condition in which the second output level is appropriate in the power circuit, a switch in the second portion of the power circuit, and a processor adapted to control the switch according to the selected signal sequence in response to the second detector detecting the selected condition.

In a preferred form of this aspect of the present invention, the selected condition is a rechargeable battery in the second portion of the power circuit which may be safely charged by the second output level in the power circuit. In another preferred form of this aspect of the present invention, the selected condition is the communication unit in a signal transmitting mode.

In still another preferred form of this aspect of the present invention, the regulator defaults the power circuit to the first power level until the selected signal sequence is detected.

In yet another preferred form of this aspect of the present invention, the regulator switches the first portion of the power circuit to a third output level responsive to a second selected condition. In preferred forms, this second selected condition is excess current in the power circuit, or a current level indicative of a fault in the power circuit, and the third output level is less than the first and second output levels.

In another aspect of the present invention, a battery charger and communication unit is provided. The charger includes a first portion of a charging circuit with first and second terminals, a detector for detecting a selected signal sequence in the charging circuit, and a regulator for switching from a first output level to a second output level in the charging circuit in response to the detector detecting the selected signal sequence. The communication unit has a port for a rechargeable battery and includes a second portion of the charging circuit through the battery port with third and fourth terminals connectable with the first and second terminals and fifth and sixth terminals connectable to terminals of a rechargeable battery when in the port. The communication unit also has a switch in the second portion of the charging circuit controlled by a processor, with the processor adapted to control the switch according to the selected signal sequence when a battery is in the port which requires the second output level.

In a preferred form of this aspect of the present invention, the detector includes a voltage detector detecting the presence of a voltage drop over a resistor in the first portion of the charging circuit, and a detector circuit detecting whether the voltage drop occurs in a sequence equal to the selected signal sequence.

In another preferred form of this aspect of the present invention, the regulator switches the first portion of the charging circuit to a third output level responsive to a selected condition. In preferred forms, this selected condition is excess current in the charging circuit, or a current level indicative of a fault in the charging circuit, and the third output level is less than the first and second output levels.

In still another preferred form of this aspect of the present invention, the regulator defaults the charging circuit to the first power level at initial connection of the first and second terminals to the third and fourth terminals and of the fifth and sixth terminals to battery terminals. In a further preferred form, the regulator maintains the second power level in the charging circuit after the detector detects the selected signal sequence in the charging circuit.

In still another aspect of the present invention, a method of supplying power to a mobile communication unit battery is provided. With this method, two terminals of a first portion of a charging circuit of an external current source are connected with two terminals of a second portion of a charging circuit in the communication unit having a battery therein. The external current source has a first output level and a selectable second output level. The presence of a selected condition is detected, the presence of such condition causing a switch in the charging circuit second portion to be automatically thrown according to a selected sequence. In response to the switch being thrown according to the selected sequence, the second output level for the external current source is selected.

In a preferred form of this aspect of the present invention, the selected condition is transmission by the mobile communication unit.

In another preferred form of this aspect of the present invention, the selected condition is the presence in the communication unit of a battery chargeable with the second output level.

It is an object of the invention to provide for maximum efficiency in charging a rechargeable battery of a communication unit.

It is another object of the invention to provide a multi-rate battery charger requiring only a two-wire output connectable to a two-wire input of a mobile communication unit having a battery to be charged.

It is still another object of the invention to provide a multi-rate battery charger which may be safely used with different types of batteries without damaging the particular battery being charged.

DESCRIPTION OF THE PREFERRED EMBODIMENT

Figure 1:
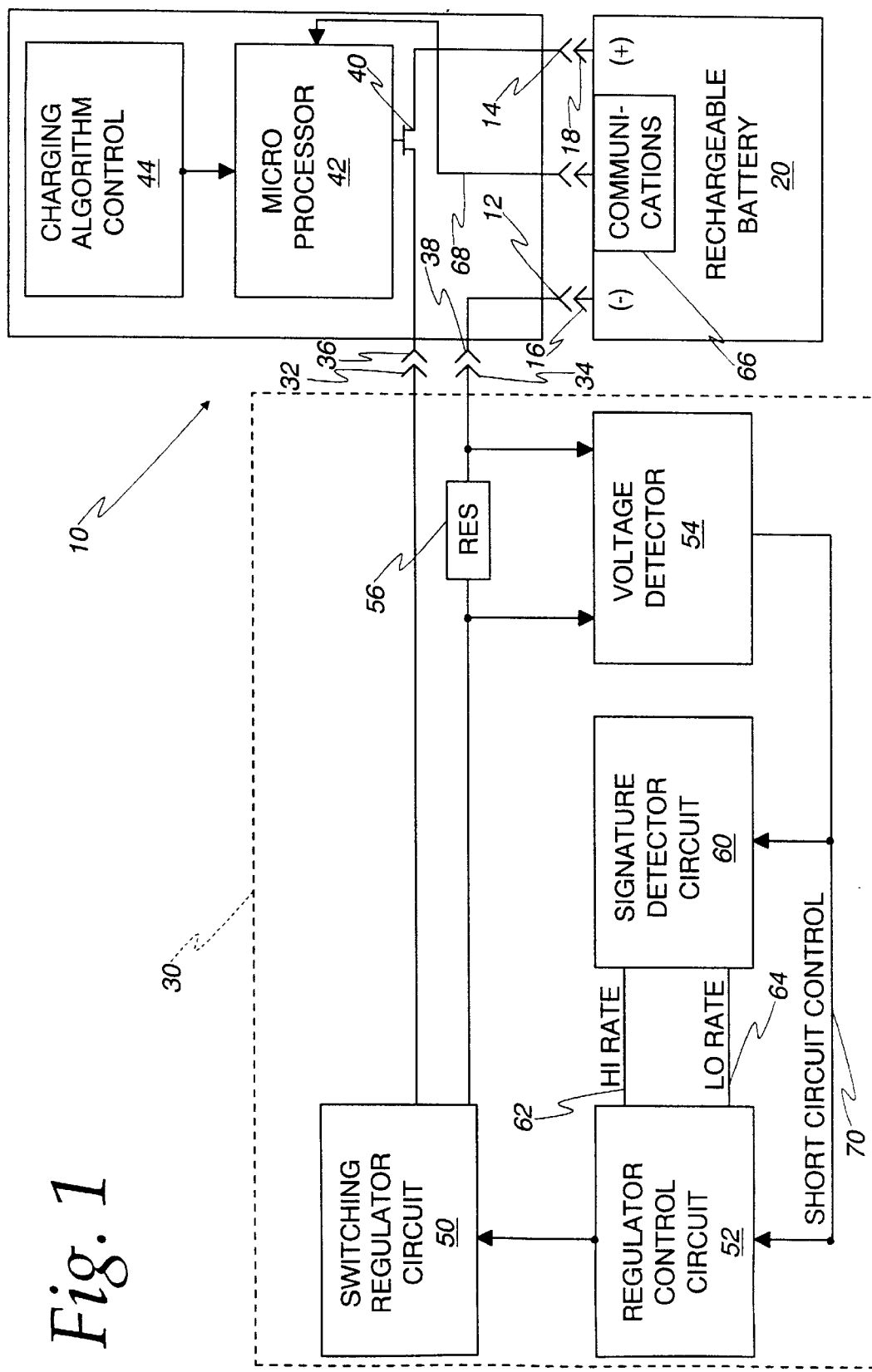
FIG. 1 is a diagram of a preferred embodiment of the present invention.

A preferred embodiment of the present invention is illustrated in FIG. 1.

A mobile communication unit 10, such as a cellular telephone, includes two terminals or leads 12, 14 connectable to terminals or leads 16, 18 of a rechargeable battery 20. As is well known in the art, the rechargeable battery 20 supplies power to the communication unit 10 so that it can be mobile, i.e., used without connection to a fixed power source. The operating components of the communication unit 10 are not shown, though it should be understood that the present invention may be incorporated into virtually any battery powered mobile communication unit 10 which has a two-wire input for charging the battery 20 while mounted in the communication unit 10.

The charger 30 includes two terminals or leads 32, 34 connect table to terminals or leads 36, 38 on the communication unit 10. The unit terminals 36, 38 are preferably a two-wire charging output with suitable adapter for connecting to the unit two-wire input such as are common in many communication units on the market today.

The portion of the charging circuit in the communication unit 10 includes a switch 40 such as a transistor, the state of which is set by a suitable microprocessor 42 controlled by a charging algorithm control 44. Specifically, the control 44 controls the processor 42 to throw the switch 40 according to a selected timing sequence or "signature" dependent upon the condition/status of the communication unit 10 and/or the type of battery 20 connected to the communication unit 10, as described further below.

The charging circuit includes a switching regulator circuit 50 which controls the output of the charger 30 between selected levels. For example, the charger 30 may be operate at either 700 mA output (which is a safe level for 450 mAh small batteries) or at 900 mA output (which would be a safe level for charging larger batteries but could damage 450 mAh small batteries). A regulator control circuit 52 controls the switching regulator circuit 50 for switching between output levels.

For example, in a preferred form, the charger 30 may be automatically switched to the higher output level when the communication unit 10 is in use. In such cases (for example, when the phone is in use in a vehicle charger), the charger 30 can supply current at a greater level to provide adequate power for transmitting during a call (and/or to provide adequate power to continue charging the battery 20 even while the unit 10 is using greater power). In another preferred form, the charger 30 will as a default operate at a lower "safe" level, that is, the level at which all batteries intended for use with the communication unit 10 may be safely charged (e.g., the 700 mA output mentioned above). In either case (or in still other conditions in which an alternate higher output level in the charger 30 is desirable), the charger 30 may be automatically switched to the higher output level in accordance with the following.

Specifically, the communication unit 10 recognizes its own condition/status (e.g., whether it is on standby, receiving or transmitting). If it is in a condition requiring only low power, the charger 30 will supply the default lower output, and the charging algorithm control 44 and microprocessor 42 will do nothing more than ensure that the switch 40 is closed to allow current to pass through the charging circuit for charging.

When the unit 10 is drawing greater current such as when transmitting, the charging algorithm control will cause the microprocessor 42 to turn the switch 40 on and off according to a selected timing sequence, effectively turning the current in the charging circuit on and off according to that sequence. A voltage detector 54 is connected to the charging circuit to sense any current drop over a resistor 56 in the charging circuit. There will be a voltage drop over the resistor 56 if there is a current (i.e., switch 40 is closed) and no voltage drop over the resistor if there is no current (i.e., switch 40 is open).

The voltage detector 54 is connected to a suitable signature detector circuit 60 which recognizes whether the voltage detector 54 sends signals indicative of a voltage drop which match the selected timing sequence of the charging algorithm control 44 indicative of a condition in which greater current levels are appropriate. If such a sequence is detected, the detector circuit 60 sends a high rate signal 62 to the regulator control circuit 52, which causes the switching regulator circuit 50 to switch to the higher output level.

The signature detector circuit 60 can also be selected to send a low rate signal 64 responsive to a second selected timing sequence sent by the unit 10 to indicate the end of transmission for continued safe charging during subsequent low power usage.

Alternatively, in the other preferred form where different battery types might be present, the communication unit 10 recognizes which type of battery 20 is mounted therein. As shown in the FIGURE, the battery 20 may be provided with a communication indicator 66 which is connectable through line 68 to the microprocessor 42 to provide information to the microprocessor 42 as to the type of battery 20.

If a smaller battery 20 requiring the default lower output of the charger 30 is in the phone, in response to the connection of the terminals 36, 38 to terminals 32, 34 to close the charging circuit, the charging algorithm control 44 and microprocessor 42 will do nothing more than ensure that the switch 40 is closed to allow current to pass through the charging circuit for charging.

However, if a larger battery 20 which may be charged with the higher output current is recognized in the communication unit, the charging algorithm control will cause the microprocessor 42 to turn the switch 40 on and off according to a selected timing sequence, effectively turning the current in the charging circuit on and off according to that sequence. The signature detector circuit 60 recognizes whether the voltage detector 54 sends signals indicative of a voltage drop which match the selected timing sequence of the charging algorithm control 44 indicative of a larger battery 20 in the communication unit 10. If such a sequence is detected, the detector circuit 60 sends a high rate signal 62 to the regulator control circuit 52, which causes the switching regulator circuit 50 to switch to the higher output level for most efficient charging of the larger battery 20 in the communication unit 10.

The signature detector circuit 60 can also be selected to send a low rate signal 64 responsive to a continuous period during which no voltage is detected by the voltage detector 54 (essentially detecting another selected timing sequence), such condition being indicative of no current in the charging circuit (whether from the absence of a connected communication unit 10 or battery 20) to effectively toggle the switching regulator circuit 50 to the "safe" default output level in preparation for charging a new battery 20.

It should now be recognized that with the present invention, the battery charger 30 may be effectively set to the proper current output without any requirement that the user act to set the proper mode (which requirement would virtually guarantee that large numbers of mistakes would be made resulting in large numbers of damaged batteries) and without requiring an additional communication wire between the communication unit 10 and charger 20.

The voltage detector 54 may also be directly connected (at 70) to the regulator control circuit 52 whereby a large voltage indicative of a short circuit in the charging circuit will, as a safety measure, cause the regulator control circuit 52 to change the switching regulator circuit 50. For example, in such a condition the circuit 50 could be changed to some lower safe power level, or could be shut down completely (for example, by blowing a suitable fuse device), or could be sequentially set back until safe power levels are detected at 70. Changing to a lower safe power level is preferred over complete shut off to allow the communication unit 10 every chance to remain active.

It should also be recognized that the present invention could be used to enhance charging even for small batteries 20 when the communication unit 10 is in use. That is, the charging algorithm control 44 may also be set to cause the switch 40 to be thrown according to the selected timing sequence during charging when the unit 10 is using significant power, such as when a cellular telephone is transmitting. The algorithm control 44 in such a case would also preferably cause the switch 40 to be thrown according to a different selected timing sequence when a small battery 20 is present and high power usage ends (e.g., a transmission ends). That is, the signature detector circuit 60 would send the low rate signal 64 when a voltage according to that different selected timing sequence is detected, thereby returning the switching regulator circuit 50 back to the lower "safe" power output for normal charging.

It should additionally be recognized that the present invention could also be used in which more than two power outputs are desired for the charger 30, with a plurality of different timing sequences used to indicate a plurality of different types of batteries 20 and controlling the switching regulator circuit 50 to select between a plurality of power output levels for charging. Such a structure could be used not only for communication units 10 which might be used with different batteries 20, but could also be used to create a universal charger 30 with a universal two-wire connector usable with many different communication units 10.

In accordance with the above, the signature detector circuit 60 can be selected to detect a variety of different timing sequences and to thereby cause a variety of different output levels to be provided in the charging circuit. For example, one output level could be provided responsive to a timing sequence indicative of one battery type in a unit in standby mode, a second output level provided responsive to a second timing sequence indicative of that battery type in a unit in transmit mode, a third output level provided responsive to a third timing sequence indicative of a second battery type in a unit in standby mode, and so forth.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A communication unit and external power source, comprising:

an external power source including a first portion of a power circuit with first and second terminals, a first detector for detecting a selected signal sequence in said power circuit, and a regulator for switching from a first output level to a second output level in said power circuit in response to said first detector detecting said selected signal sequence; and a communication unit including a second portion of the power circuit having third and fourth terminals connectable with said first and second terminals, a second detector for detecting a selected condition in which the second output level is appropriate in the power circuit, a switch in said second portion of the power circuit, and a processor adapted to control said switch according to said selected signal sequence in response to said second detector detecting said selected condition.

2. The communication unit and external power source of claim 1, wherein said selected condition is a rechargeable battery in the second portion of the power circuit which may be safely charged by the second output level in the power circuit.

3. The communication unit and external power source of claim 1, wherein said selected condition is the communication unit transmitting a signal.

4. The communication unit and external power source of claim 1, wherein said regulator defaults said power circuit to said first power level until said selected signal sequence is detected.

5. The communication unit and external power source of claim 1, wherein said regulator switches said first portion of the power circuit to a third output level responsive to a second selected condition.

6. The communication unit and external power source of claim 5, wherein said second selected condition is excess current in the power circuit and said third output level is less than said first and second output levels.

7. The communication unit and external power source of claim 5, wherein said second selected condition is a current level indicative of a fault in the power circuit and said third output level is less than said first and second output levels.

8. A battery charger and communication unit, comprising:
   a charger including
      a first portion of a charging circuit with first and second terminals,
      a detector for detecting a selected signal sequence in said charging circuit, and
      a regulator for switching from a first output level to a second output level in said charging circuit in response to said detector detecting said selected signal sequence; and
   a communication unit with a port for a rechargeable battery, said unit including
      a second portion of the charging circuit through the battery port including
         third and fourth terminals connectable with said first and second terminals, and
         fifth and sixth terminals connectable to terminals of a rechargeable battery when in said port, and
      a switch in said second portion of said charging circuit controlled by a processor, said processor adapted to control said switch according to said selected signal sequence when a battery is in the port which requires said second output level.

9. The battery charger and communication unit of claim 8, wherein said detector comprises:

a voltage detector detecting the presence of a voltage drop over a resistor in the first portion of the charging circuit; and a detector circuit detecting whether said voltage drop occurs in a sequence equal to said selected signal sequence.

10. The battery charger and communication unit of claim 8, wherein said regulator changes the first portion of said charging circuit to a third output level responsive to a selected condition in said charging circuit.

11. The battery charger and communication unit of claim 10, wherein said selected condition is excess current in the charging circuit and said third output level is less than said first and second output levels.

12. The battery charger and communication unit of claim 10, wherein said selected condition is a current level indicative of a fault in the charging circuit and said third output level is less than said first and second output levels.

13. The battery charger and communication unit of claim 8, wherein said regulator defaults said charging circuit to said first power level at initial connection of said first and second terminals to said third and fourth terminals and of said fifth and sixth terminals to battery terminals.

14. The battery charger and communication unit of claim 13, wherein said regulator maintains said second power level in said charging circuit after said detector detects the selected signal sequence in said charging circuit.

15. A method of supplying power to a mobile communication unit battery, comprising the steps of:
   connecting two terminals of a first portion of a charging circuit of an external current source with two terminals of a second portion of a charging circuit in the communication unit having a battery therein, said external current source having a first output level and a selectable second output level;
   detecting the presence of a selected condition;
   automatically throwing a switch in the charging circuit second portion according to a selected sequence if the selected condition is present; and
   selecting said second output level for said external current source in response to said switch being thrown according to said selected sequence.

16. The method of claim 15, wherein said selected condition is transmission by the mobile communication unit.

17. The method of claim 15, wherein said selected condition is a battery chargeable with the second output level.

* * * * *